United States Patent
Takeda et al.

(10) Patent No.: US 6,910,722 B2
(45) Date of Patent: Jun. 28, 2005

(54) SIDE MOULDING FOR MOTOR VEHICLE

(75) Inventors: Kazuo Takeda, Aichi-ken (JP);
Daiichiro Kawashima, Aichi-ken (JP);
Masao Kobayashi, Aichi-ken (JP);
Kazutoshi Ikeda, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/667,404

(22) Filed: Sep. 23, 2003

(65) Prior Publication Data

US 2004/0061348 A1 Apr. 1, 2004

(30) Foreign Application Priority Data

Sep. 30, 2002 (JP) ........................................ 2002-285921

(51) Int. Cl.[7] ............................................ B60R 19/42
(52) U.S. Cl. ..................................... 293/128; 52/716.7
(58) Field of Search ............................. 52/716.5, 716.6, 52/716.7; 293/126; 24/292, 297

(56) References Cited

U.S. PATENT DOCUMENTS

| | | | | |
|---|---|---|---|---|
| 3,572,799 A | * | 3/1971 | Truesdell et al. | 293/128 |
| 3,897,967 A | * | 8/1975 | Barenyi | 293/128 |
| 4,363,839 A | * | 12/1982 | Watanabe et al. | 293/128 |
| 4,613,178 A | * | 9/1986 | Fujita | 293/128 |
| 4,838,004 A | * | 6/1989 | Adell | 293/128 |
| 4,911,971 A | * | 3/1990 | McCue et al. | 293/128 |
| 4,946,727 A | * | 8/1990 | Kessler | 293/128 |
| 5,096,753 A | * | 3/1992 | McCue et al. | 293/128 |
| 5,195,793 A | * | 3/1993 | Maki | 293/128 |
| 5,202,172 A | * | 4/1993 | Graf | 293/128 |
| 5,283,096 A | * | 2/1994 | Greenberg et al. | 52/716.6 |
| 5,350,608 A | * | 9/1994 | Zoller | 293/128 |
| 5,353,571 A | * | 10/1994 | Berdan et al. | 52/716.5 |
| 5,456,957 A | * | 10/1995 | Jackson et al. | 293/1 |
| 5,639,522 A | * | 6/1997 | Maki et al. | 293/128 |
| 6,681,543 B2 | * | 1/2004 | Nada et al. | 293/128 |

FOREIGN PATENT DOCUMENTS

JP          A-2000-6731          1/2000

* cited by examiner

Primary Examiner—D. Glenn Dayoan
Assistant Examiner—Lori L. Coletta
(74) Attorney, Agent, or Firm—Posz & Bethards, PLC

(57) ABSTRACT

A side moulding which is readily manufactured and mounted on an exterior side surface of a body or door of a motor vehicle, and is free from the generation of noise during the running of the motor vehicle or upon the opening and closing of the door of the motor vehicle. The side moulding includes a main body, clips for mounting the main body to the body or door of the motor vehicle, and cushion members provided in a rear surface of the main body. Each of the cushion members includes a cushion part for achieving a cushioning operation against the main body, and the body or door of the motor vehicle, and a fitting part for fitting to each of rib parts provided in the rear surface of the main body.

8 Claims, 4 Drawing Sheets

SIDE MOULDING FOR MOTOR VEHICLE

CROSS-REFERENCE TO RELATED APPLICATION

This application is related to and claims priority from Japanese patent application No. 2002-285921, incorporated herein by reference.

BACKGROUND OF THE INVENTION

1. Field of the Invention

The present invention relates to a side moulding for mounting on an exterior side surface of a body or door of a motor vehicle.

2. Description of Related Art

Conventionally, side mouldings have been mounted on exterior side surfaces of a body and doors of a motor vehicle by clips or double-sided adhesive tapes.

In the case of a side moulding being mounted by clips, protruding clip-attaching parts are provided in a rear surface of a main body of the side moulding, and the clips are fitted to the clip-attaching parts, or welded thereto using ultrasonic waves, thereby attaching the clips to the side moulding. Then, the clips attached are inserted into clip holes provided in the body or door of the motor vehicle, thereby mounting the side moulding on the motor vehicle. One example of such a conventional side moulding is disclosed in Publication of Japanese unexamined patent application No. 2000-6731, on pages 3 to 4, and in FIG. 2.

In the case of a side moulding being mounted by double-sided adhesive tapes, they have been previously bonded to longitudinally extending side edges of a rear surface of a main body of the side moulding, and after peeling releasing sheets from the double-sided adhesive tapes, they have been pressed on the body or door of the motor vehicle, thereby bonding the side moulding to the motor vehicle.

In order to mount the side moulding by only the double-sided adhesive tapes, they must have a considerably large contact area against the body or door of the motor vehicle. But, since the double-sided adhesive tapes are expensive, manufacturing costs of the side moulding are caused to increase.

In addition, in order to effect a sufficient bonding force, the double-sided adhesive tapes must have a considerably large width so that it is difficult to reduce the width of the side moulding. Consequently, the side moulding cannot be freely designed, and the weight of the side moulding increases.

Furthermore, where the side moulding is mounted by the double-side adhesive tapes, a mounting area of an exterior side surface of a body or door of the motor vehicle is required to be clean and free from dust, oil or the like, and is also required to be free from surface irregularities. Consequently, the control of the assembling process of the motor vehicle becomes complicated.

In order to solve these problems, the side moulding has been mounted by clips. But, when the number of the clips is too many, manufacturing costs increase, and time and labor for mounting the side moulding also increase. Accordingly, the clips have been attached to the rear surface of the side moulding at some long distances.

Where the side moulding is mounted on the body or door of the motor vehicle by the clips attached to the rear surface of the side moulding, there may occur a gap between the side moulding and a facing exterior side surface of the body or door between adjacent clips due to the curving and the surface irregularities of the body or door of the motor vehicle.

When a gap exists between the side moulding and the body or door, noise is generated during the running of the motor vehicle, or upon the opening and closing of the door.

Recently, for reducing the weight of the motor vehicle, body panels and door panels have been made thinner. In this case, when the door is closed hard, for example, noise may be frequently generated.

Under these circumstances, as shown in FIG. 1, conventionally, a side moulding 10 has been mounted on a body or door of a motor vehicle by clips 12, and bonded thereto by double-sided adhesive tapes 14. In this example, the double-sided adhesive tapes 14 are bonded to projecting ends of ribs 16 which project from a rear surface of a main body 18 of the side moulding 10.

In another example, a soft member is formed along each of side edges of a main body of a side moulding with a duplex extrusion process for achieving a shock absorbing operation.

In the case of the side moulding 10 being mounted by both the clips 12 and the double-sided adhesive tapes 14, manufacturing costs increase, and the inserting work of the clips 12 and the bonding work of the double-sided adhesive tapes 14 are needed to increase time and labor therefor.

In addition, for ensuring sufficient bonding strength of the double-sided adhesive tapes 14, they must have a considerably large width, and accordingly, it is difficult to reduce the width of the side moulding 10, whereby the side moulding 10 cannot be designed freely.

In order to bond the double-sided adhesive tapes 14 to the body or door of a motor vehicle, the double-sided adhesive tapes 14 bonded to the side moulding 10 must be pressed on the body or door with a sufficient pressing force. To this end, the projecting height of the ribs 16 must be adjusted without scattering, and consequently, time and labor are required to control the manufacturing process of the side moulding 10.

Where the soft member is formed along each of the side edges of the main body of the side moulding by a duplex extrusion process, a border line between the soft member and a hard member appears along each of the side edges of the side moulding, thereby deteriorating the appearance of the side moulding, and increasing manufacturing costs.

SUMMARY OF THE INVENTION

Accordingly, it is an object of the present invention to provide a side moulding which is readily manufactured and mounted on an exterior side surface of a body or door of a motor vehicle, and is prevented from generating noise in a gap between the side moulding and the exterior side surface of the body or door during the running of the motor vehicle, and upon the opening and closing of a vehicle door.

In accordance with the present invention, the side moulding for mounting on an exterior side surface of a body or door of a motor vehicle includes a main body, clips for mounting the main body on the body or door of the motor vehicle, and cushion members provided in a rear surface of the main body. Each of the cushion members includes a cushion part for achieving a cushioning operation against the main body, and the body or door of the motor vehicle, and a fitting part for fitting to each of rib parts provided in the rear surface of the main body.

In accordance with the present invention, the cushion members are provided in the rear surface of the main body of the side moulding. When the side moulding is mounted by the clips, each cushion member is interposed between the main body of the side moulding and the body or door of the motor vehicle, and the cushion part of each cushion member achieves a cushioning operation against the main body, and the body or door of the motor vehicle. Consequently, the side moulding is brought into close contact with the exterior side surface of the body or door, thereby preventing the side moulding from vibrating during the running of the motor vehicle and upon the opening and closing of the vehicle door. Accordingly, there is not generated noise around the side moulding.

In addition, since each cushion member is fitted to each rib part provided in the rear surface of the main body of the side moulding, the cushion members can be readily attached to the main body, thereby improving the productivity of the side moulding.

In a preferred embodiment of the present invention, each rib part is provided along each of longitudinally extending side edges of the rear surface of the main body over the approximately entire length thereof, and each cushion member is attached to each rib part thus provided.

With this arrangement, since each rib part is provided along each of the longitudinally extending side edges of the rear surface of the main body over the approximately entire length thereof, and each cushion member is attached to each rib part, each cushion member can be attached along each of the side edges of the rear surface of the side moulding over the approximately entire length thereof. Accordingly, the side moulding can be brought into close contact with the exterior side surface of the body or door securely with a reaction force exerted by each cushion member that is provided along each of the side edges of the side moulding. Consequently, the side moulding is prevented from vibrating during the running of the motor vehicle and upon the opening and closing of the door, thereby preventing the generation of noise around the side moulding.

In another preferred embodiment, each rib part provided along each of longitudinally extending side edges of the rear surface of the main body over the approximately entire length thereof is composed of two ribs, and the fitting part of each cushion member is fitted between the two ribs of each rib part.

With this arrangement, since each rib part is composed of two ribs, and the fitting part of each cushion member is fitted between two ribs of each rib part, by merely inserting each cushion member between two ribs of each rib part, the cushion members can be attached to the main body of the side moulding securely, and accordingly, the side moulding can be readily manufactured, and the cushion members can be securely held by the main body.

In still another preferred embodiment, the cushion part of each cushion member includes a lip extending in such a manner as to be fitted between each of the longitudinally extending side edges of the main body and the body or door of the motor vehicle.

With this arrangement, since the cushion part includes a lip extending in such a manner as to be fitted between each of the longitudinally extending side edges of the main body and the body or door of the motor vehicle, a gap can be prevented from occurring between each of the longitudinally extending side edges of the main body and the body or door of the motor vehicle, thereby preventing the generation of such noise as to have been encountered when the side edges of the conventional side moulding come into contact with a body or door of a motor vehicle.

In a further preferred embodiment, the cushion part and the fitting part of each cushion member are composed of different materials from each other.

With this arrangement, since the cushion part and the fitting part are composed of different materials from each other, the fitting part may be composed of a material having strength and elasticity required to be fitted to each rib part, whereas the cushion part may be composed of a material having flexibility and elasticity. Accordingly, the materials for the cushion part and the fitting part of the cushion member can be selected freely.

In a still further preferred embodiment, the cushion part and the fitting part of each cushion member are composed of the same material as each other.

With this arrangement, since the cushion part and the fitting part are composed of the same material as each other, the cushion part and the fitting part can be strongly joined to each other.

In a further preferred embodiment, the fitting part of each cushion member is composed of a material having a greater hardness than that of a material of the main body of the side moulding.

With this arrangement, since the fitting part has a greater hardness than the main body of the side moulding, the cushion members can be securely attached to the rib parts provided in the main body.

In a still further preferred embodiment, each clip is arranged so as to exert a reaction force of 0.5 N to 50 N when the side moulding is mounted on the body or door of the motor vehicle.

With this arrangement, since the reaction force of each clip, which is exerted when the side moulding is mounted on the body or door, ranges from 0.5 N to 50 N, a mounting force required for mounting the side moulding to the body or door of the motor vehicle can be reduced, thereby facilitating the mounting work of the side moulding.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 1:
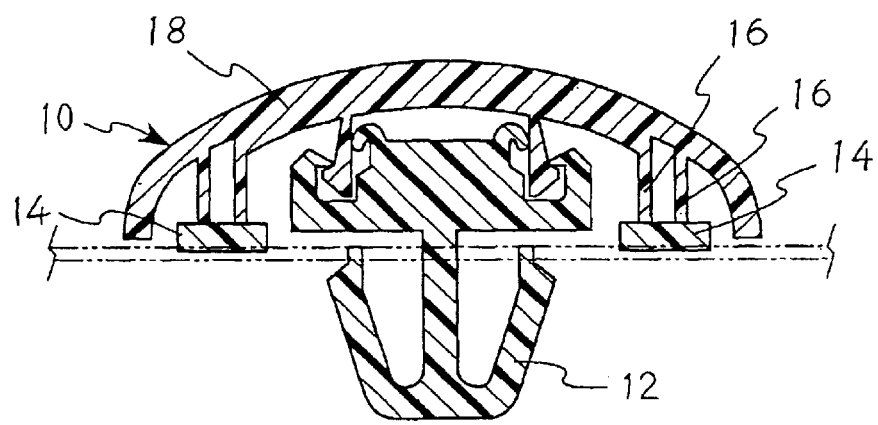
FIG. 1 is a cross-sectional view of a conventional side moulding for mounting to a motor vehicle.
Figure 2:
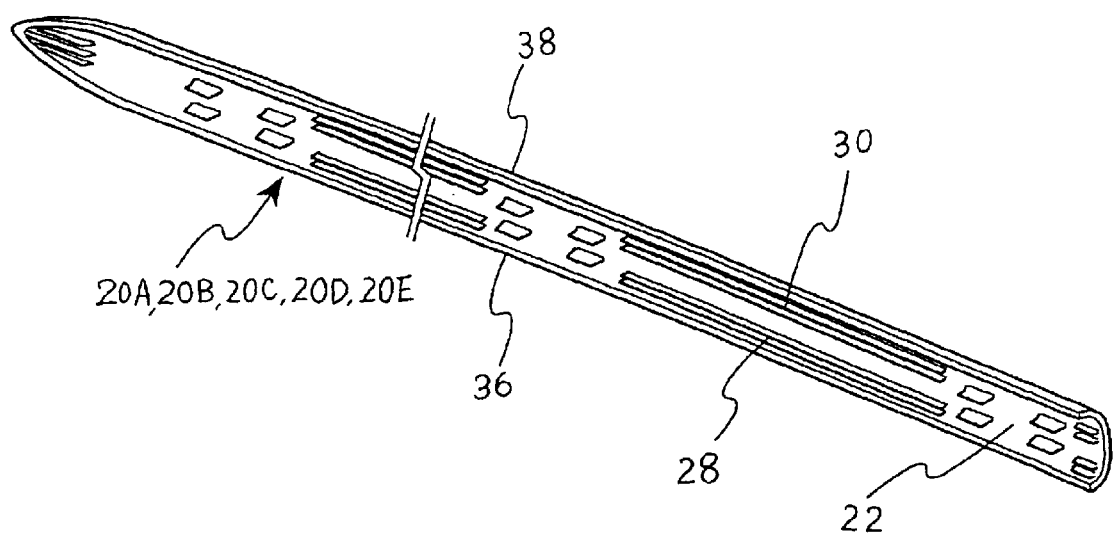
FIG. 2 is a partially cut away perspective view showing a rear surface of a main body of a side moulding in accordance with the present invention.
Figure 3:
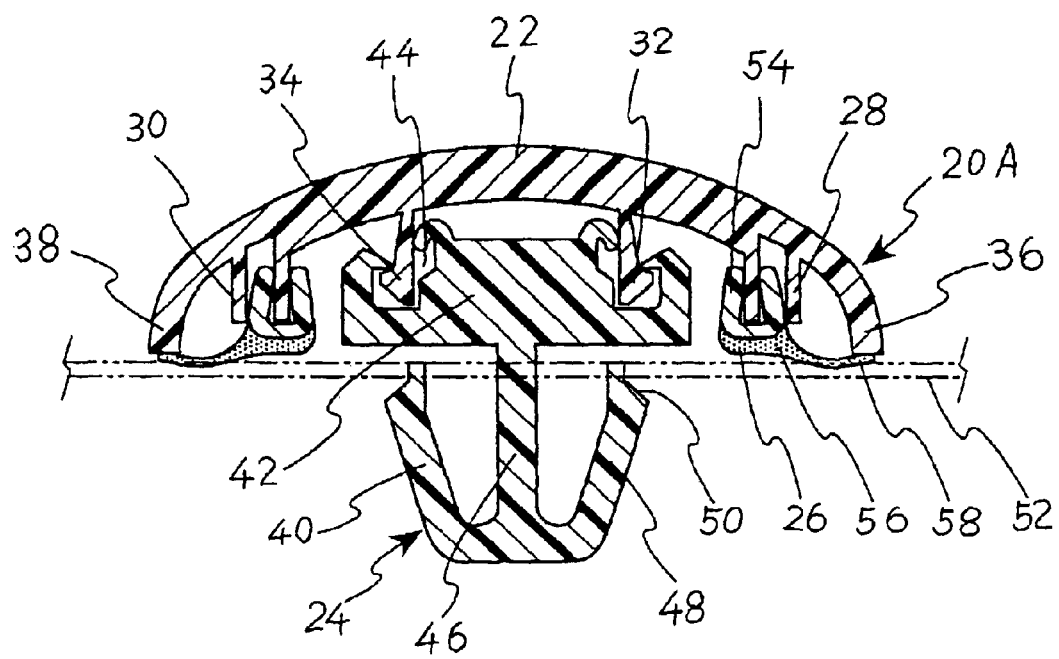
FIG. 3 is a cross-sectional view of a first embodiment of a side moulding in accordance with the present invention, which is mounted on a motor vehicle.

Hereinafter, several embodiments of the present invention will be explained with reference to the drawings. FIG. 2 shows a rear surface of a main body of a side moulding in accordance with the present invention, and FIG. 3 shows a cross-section of a first embodiment of a side moulding in accordance with the present invention, which is mounted on a motor vehicle.

As shown, a side moulding 20A includes a main body 22, clips 24 for mounting the main body 22 on a body or door of a motor vehicle, and cushion members 26 attached to the main body 22 for contacting and pressing the body or door of the motor vehicle.

The main body 22 has a strip-shaped configuration, and has an arc-shaped cross-section. An exterior surface of the main body 22 is colored, similarly to the color of the body of the motor vehicle. Rib parts 28 and 30 for attaching the cushion members 26 to the side moulding 20A are provided in the rear surface of the main body 22 so as to extend along side edges of the rear surface toward the vicinity of each of longitudinal ends thereof. In the present embodiment, each of the rib parts 28 and 30 is composed of two ribs.

In addition, ribs 32 and 34 for attaching the clip 24 to the side moulding 20A are provided in the rear surface of the main body 22 at distances of 100 to 250 mm.

The ribs 32 and 34 are provided near the center of the main body 22, and a projection is formed at an end of each of the ribs 32 and 34 for engaging with the clip 24.

The rib parts 28 and 30 are provided outwardly of the ribs 32 and 34 and inwardly of side edges 36 and 38 of the main body 22.

The main body 22 including the rib parts 28 and 30, ribs 32 and 34, and the side edges 36 and 38 are integrally formed of synthetic resin such as polypropylene resin, etc. by injection molding.

The clip 24 includes a leg part 40 for fitting in the vehicle body or vehicle door, and a head 42 for attaching to the main body 22.

The head 42 has grooves 44 in which the ribs 32 and 34 of the main body 22 are to be fitted. Hook-shaped projections project into an opening of each groove 44, and when the ribs 32 and 34 are inserted into the grooves 44, the projections of the ribs 32 and 34 are held by the hook-shaped projections of the grooves 44, whereby the clip 24 is securely attached to the main body 22.

The leg part 40 includes a central leg 46 which extends from an approximate center of the head 42, and engaging legs 48 which extend obliquely upwardly from an end of the central leg 46 rightwards and leftwards. Each of the engaging legs 48 has a step 50 for engaging with a panel 52 of the vehicle body or vehicle door when the clip 24 is inserted therein.

The cushion member 26 includes a fitting part 54 for fitting to each of the rib parts 28 and 30 of the main body 22, and a cushion part 56 for achieving a cushioning operation against the panel 52 and the main body 22.

In the present embodiment, the fitting part 54 has a generally U-shaped cross-section, and fits on an inside rib composing each of the rib parts 28 and 30. Side walls of the fitting part 54 are tapered to narrow an opening thereof. Accordingly, the fitting part 54 can hold the inside rib composing each of the rib parts 28 and 30 firmly. An outer side wall of the fitting part 54 fitting on the inside rib of each of the rib parts 28 and 30 is held by an outside rib of each of the rib parts 28 and 30, whereby the cushion member 26 is held more firmly.

The cushion part 56 is provided integrally with a bottom wall of the fitting part 54, and a lip 58 extends from an outside end of the cushion part 56 toward a space between each of the side edges 36 and 38 of the main body 22, and the panel 52 of the motor vehicle.

With this arrangement, since the side moulding 20A is mounted on the vehicle body or vehicle door with the space between each of the side edges 36 and 38 of the main body 22, and the panel 52 filled with the lip 58 of each cushion member 26, the side edges 36 and 38 of the main body 22 do not come into contact with the panel 52, thereby preventing the generation of noise during the running of the motor vehicle, or upon the opening and closing of the vehicle door.

In addition, since the space between each of the side edges 36 and 38 of the main body 22, and the panel 52 is filled with the lip 58 of each cushion member 26, the severe adjustment of the dimensions of this space is not required, whereby the control of the manufacturing steps of the side moulding 20A is facilitated.

The fitting part 54 of each cushion member 26 may be composed of hard synthetic resin such as polyolefin-based resin of which one example is polypropylene resin. This polypropylene resin has a modulus of bending elasticity (JIS K6758) of 800 Mpa, for example. It is preferable that the hardness of the material of the fitting part 54 is higher than that of the main body 22 for increasing the holding force of the fitting part 54 against the rib parts 28 and 30.

The cushion part 56 of each cushion member 26 may be composed of a soft material such as EPDM rubber, thermoplastic elastomer, polyolefin-based resin of which one example is soft polypropylene resin. EPDM rubber and thermoplastic elastomer may be foamed for making them softer. The hardness (JIS A hardness: JIS K6301) of the EPDM rubber is 50°, for example.

The fitting part 54 and the cushion part 56 may be composed of different materials from each other. In one example, the fitting part 54 is composed of polypropylene resin, whereas the cushion part 56 is composed of EPDM rubber. With this arrangement, the hardness of the cushion part 56 can be selected freely, and the cushion part 56 can be designed freely.

Alternatively, the fitting part 54 and the cushion part 56 may be composed of the same material as each other. In one example, the fitting part 54 is composed of hard polypropylene resin, whereas the cushion part 56 is composed of soft polypropylene resin. With this arrangement, the cushion part 56 and the fitting part 54 are fused and welded to each other, whereby these parts 54 and 56 are secured firmly.

Each cushion member 26 can be prepared by forming the fitting part 54 and the cushion part 56 by co-extrusion.

Next, the method for mounting the side moulding 20A thus arranged to a body or door of a motor vehicle will be explained.

The clips 24 and the cushion members 26 are attached to the main body 22 of the side moulding 20A. The head 42 of each clip 24 is fitted on the ribs 32 and 34 provided in the rear surface of the main body 22 at distances of 100 to 250 mm. The fitting part 54 of each cushion member 26 is fitted to each of the rib parts 28 and 30 provided along the side edges of the main body 22.

The side molulding 20A to which the clips 24 and the cushion members 26 are thus attached is mounted on the body or door of the motor vehicle by inserting the leg part 40 of each clip 24 in each of clip holes (not shown) which have been previously provided in the panel 52 of the motor vehicle.

The steps 50 provided in the engaging legs 48 of the leg part 40 of each clip 24 are engaged with the panel 52 around each clip hole, whereby the side moulding 20A is mounted on the body or door of the motor vehicle.

At this time, the lip 58 of each cushion member 26 exists between each of the side edges 36 and 38 of the main body 22 and the panel 52, and is strongly held with each of the side edges 36 and 38 of the main body 22 and the panel 52 by a retaining force of the clips 24. Consequently, there is not generated noise during the running of the motor vehicle or upon the opening and closing of doors of the motor vehicle.

Figure 4:
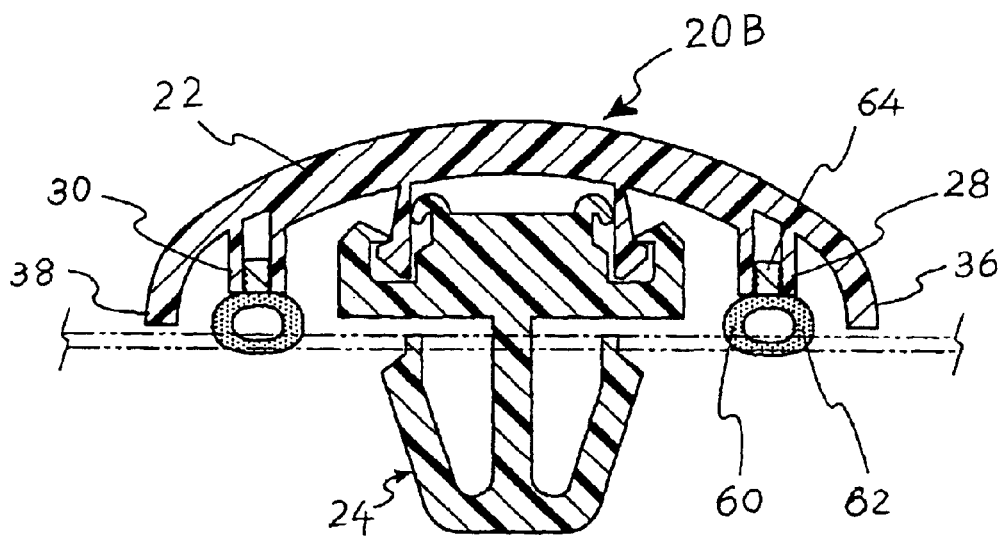
FIG. 4 is a cross-sectional view of a second embodiment of a side moulding in accordance with the present invention, which is mounted on a motor vehicle.

A second embodiment of the present invention will be explained with reference to FIG. 4. Explanations of the arrangement of the present embodiment, which is common to that of the first embodiment, will be omitted.

The present embodiment differs from the first embodiment in the arrangement of cushion members for attachment to a side moulding. As shown in FIG. 4, each cushion member 60 includes a cushion part 62 and a fitting part 64. These parts 62 and 54 are formed integrally with each other.

The cushion part 62 is composed of a soft material, and has a tubular configuration. The fitting part 64 is composed of hard synthetic resin, and has a generally rectangular cross-section. The fitting part 64 has a width capable of fitting between two ribs of each of the rib parts 28 and 30, and side surfaces of the fitting part 64 for abutting the two ribs of each of the rib parts 28 and 30 are corrugated.

The materials for the cushion part 62 and the fitting part 64 of the present embodiment may be the same as those in the first embodiment.

When the cushion members 60 are attached to the main body 22 of a side moulding 20B, the fitting part 64 of each cushion member 60 is fitted between two ribs of each of the rib parts 28 and 30 which respectively extend along the side edge of the main body 22. By virtue of the corrugated side surfaces of the fitting part 64, the cushion members 60 can be attached to the main body 22 securely.

When the side moulding 20B thus arranged is mounted on the body or door of the motor vehicle, the tubular cushion part 62 abuts the body or door of the motor vehicle with good sealing properties.

By virtue of the elasticity of the tubular cushion part 62, a reaction force of the cushion members can be maintained from 0.5 N to 50 N in the mounted state of the side moulding 20B to the motor vehicle, and accordingly, during the running of the motor vehicle and upon the opening and closing of the door thereof, the side edges 36 and 38 of the main body 22 are prevented from coming into contact with the vehicle body or vehicle door, thereby generating no noise.

In addition, by virtue of the elasticity of the tubular cushion part 62, the inserting load of each clip upon the mounting of the side moulding 20B on the vehicle body or vehicle door can be reduced to 5 kg/f or less. This results in the insertion of the clips 24 of the side moulding 20B being facilitated, thereby improving the mounting efficiency of the side moulding 20B.

Figure 5:
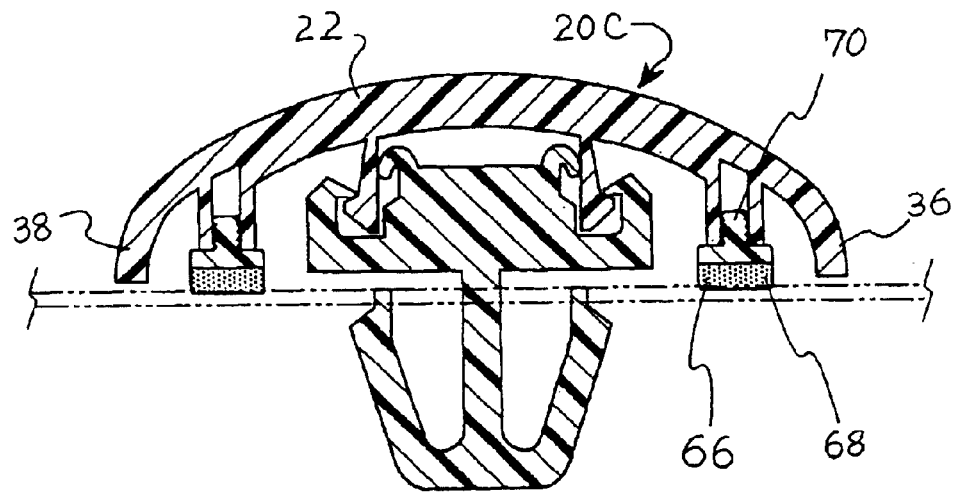
FIG. 5 is a cross-sectional view of a third embodiment of a side moulding in accordance with the present invention, which is mounted on a motor vehicle.

A third embodiment of the present invention will be explained with reference to FIG. 5. Explanations of the arrangement of the present embodiment, which is common to that of the first embodiment, will be omitted.

The present embodiment differs from the first embodiment in the arrangement of cushion members for attachment to a side moulding. As shown in FIG. 5, each cushion member 66 includes a cushion part 68 and a fitting part 70. These parts 68 and 70 are formed integrally with each other.

The cushion part 68 has a generally rectangular cross-section, and exhibits elasticity. The fitting part 70 has the arrangement similar to that of the fitting part 64 in the second embodiment, but has a generally inverted T-shaped cross-section for holding the cushion part 68 securely.

The materials for the cushion part 68 and the fitting part 70 of the present embodiment may be the same as those in the first embodiment.

With the present embodiment, by virtue of the elasticity of the cushion part 68, a reaction force of the cushion members can be maintained in a range from 0.5 N to 50 N in the mounted state of a side moulding 20C to the motor vehicle, like the second embodiment, and accordingly, during the running of the motor vehicle and upon the opening and closing of the door thereof, the side edges 36 and 38 of the main body 22 are prevented from coming into contact with the body or door, thereby generating no noise.

In addition, by virtue of the elasticity of the cushion part 68, the inserting load of each clip upon the mounting of the side moulding 20C to the vehicle body or vehicle door can be reduced to 5 kg/f or less.

Figure 6:
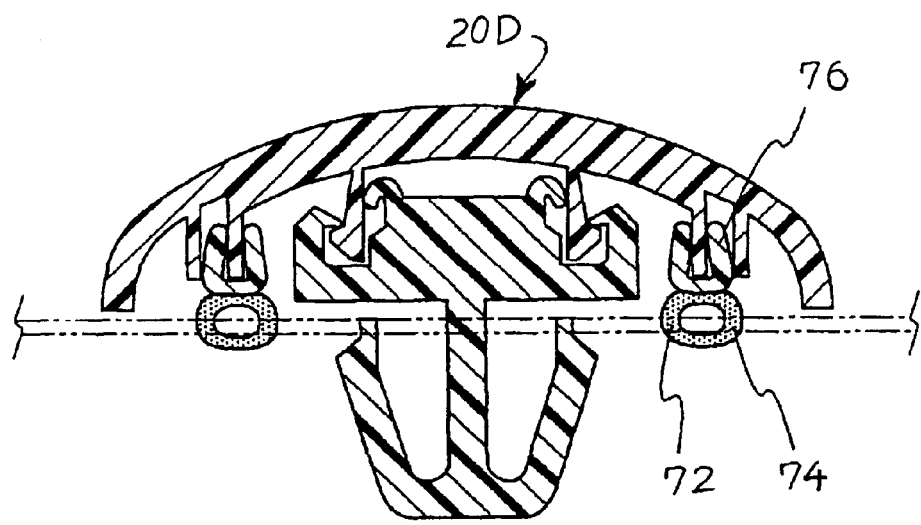
FIG. 6 is a cross-sectional view of a fourth embodiment of a side moulding in accordance with the present invention, which is mounted on a motor vehicle.

A fourth embodiment of the present invention will be explained with reference to FIG. 6. Explanations of the arrangement of the present embodiment, which is common to that of the first embodiment, will be omitted The present embodiment differs from the first embodiment in the arrangement of cushion members for attachment to a side moulding, and differs from the second embodiment in the arrangement of a fitting part of each cushion member. As shown in FIG. 6, each cushion member 72 for attachment to a side moulding 20D includes a cushion part 74 and a fitting part 76 which are formed integrally.

The cushion part 74 has the arrangement similar to that of the cushion part 62 in the second embodiment, and achieves the operational advantage similar to that of the second embodiment.

The fitting part 76 has the arrangement similar to that of the fitting part 54 in the first embodiment, and has a generally U-shaped cross-section.

Figure 7:
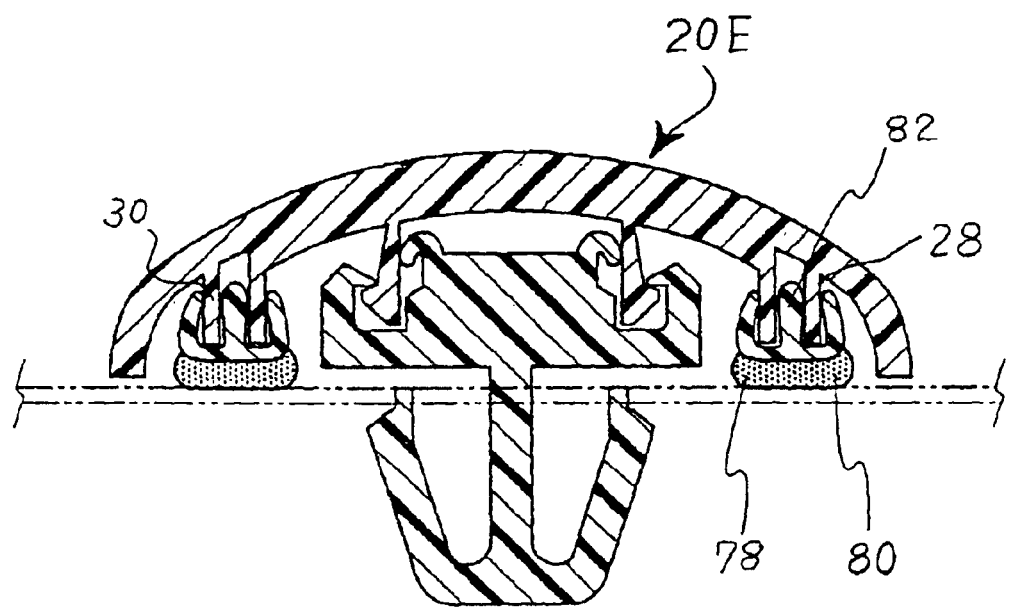
FIG. 7 is a cross-sectional view of a fifth embodiment of a side moulding in accordance with the present invention, which is mounted on a motor vehicle.

A fifth embodiment of the present invention will be explained with reference to FIG. 7. Explanations of the arrangement of the present embodiment, which is common to that of the first embodiment, will be omitted The present embodiment differs from the first embodiment in the arrangement of cushion members, and differs from the third embodiment in the arrangement of a fitting part of each cushion member. As shown in FIG. 7, each cushion member 78 includes a cushion part 80 and a fitting part 82. These parts 80 and 82 are formed integrally with each other.

The cushion part 80 has the arrangement similar to that of the cushion part 68 in the third embodiment, and achieves the operational advantage similar to that of the third embodiment.

The fitting part 82 has a generally E-shaped cross-section, and when the cushion members 78 are attached to the main body 22 of a side moulding 20E, two ribs of each of the rib parts 28 and 30 are fitted into two depressions of the fitting part 82. Since the two ribs of each of the rib parts 28 and 30 are fitted in the fitting part 82, the fitting part 82 can hold these two ribs securely.

Figure 8:
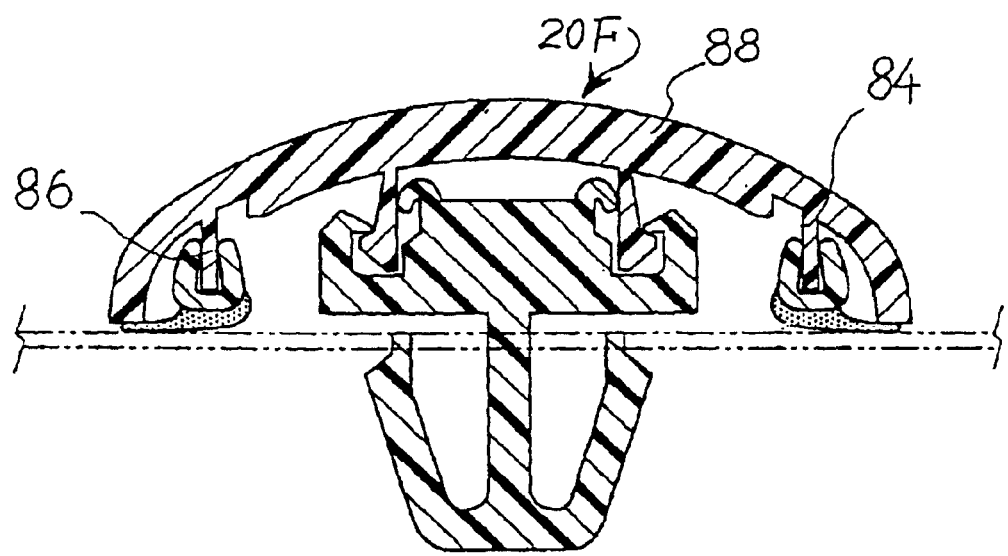
FIG. 8 is a cross-sectional view of a sixth embodiment of a side moulding in accordance with the present invention, which is mounted on a motor vehicle.

A sixth embodiment of the present invention will be explained with reference to FIG. 8. Explanations of the arrangement of the present embodiment, which is common to that of the first embodiment, will be omitted The present embodiment differs from the first embodiment in the arrangement of ribs for attaching cushion members to a side moulding. As shown in FIG. 8, each of rib parts 84 and 86 is composed of one rib provided along each side edge of a main body 88 of a side moulding 20F. With this arrangement, the width of the side moulding 20F can be reduced, and accordingly, the side moulding can be designed more freely.

In accordance with the present invention, cushion members are attached to a rear surface of a main body of a side molding. Accordingly, when the side moulding is mounted on an exterior side surface of a body or door of a motor vehicle by clips, a cushion part of each cushion member achieves a cushioning operation, whereby the side moulding is brought into close contact with the exterior side surface of the body or door of the motor vehicle to prevent the side moulding from vibrating, and generating noise during the running of the motor vehicle and upon the opening and closing of the door thereof.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A side moulding for mounting on an exterior side surface of a body and door of a motor vehicle, comprising:
    a main body;
    clips provided in said main body for mounting said main body to the body and door of the motor vehicle; and
    cushion members provided in a rear surface of said main body, each of said cushion members including a cushion part which achieves a cushioning operation against said main body and the exterior side surface of the motor vehicle, and a fitting part Which fits each of rib parts provided in said rear surface of said main body for fitting said cushion members to said main body.

2. A side moulding as claimed in claim 1, wherein each of said rib parts is provided along each of longitudinally extending side edges of said main body over an approximately entire length thereof, and each of said cushion members is attached to each of said rib parts.

3. A side moulding as claimed in claim 2, wherein each of said rib parts is composed of two ribs, and said fitting part of each of said cushion members is fitted between said two ribs of each of said rib parts.

4. A side moulding as claimed in claim 1, wherein said cushion part of each of said cushion members includes a lip which extends in such a manner as to be fitted between each of said longitudinally extending side edges of said main body and the exterior side surface of the motor vehicle.

5. A side moulding as claimed in claim 1, wherein said cushion part and said fitting part of each of said cushion members are composed of different materials from each other.

6. A side moulding as claimed in claim 1, wherein said cushion part and said fitting part of each of said cushion members are composed of the same material as each other.

7. A side moulding as claimed in claim 1, wherein said fitting part of each of said cushion members is composed of a material having a greater hardness than that of a material of said main body.

8. A side moulding as claimed in claim 1, wherein each of said clips is arranged so as to exert a reaction force of 0.5 N to 50 N when said side moulding is mounted on the exterior side surface of the motor vehicle.

* * * * *